United States Patent [19]

Shook

[11] Patent Number: 5,385,360
[45] Date of Patent: Jan. 31, 1995

[54] HEADSET LOCKING MECHANISM

[75] Inventor: William B. Shook, Tampa, Fla.

[73] Assignee: Thurston, Inc., Columbus, Ohio

[21] Appl. No.: 123,515

[22] Filed: Sep. 17, 1993

[51] Int. Cl.6 .................................................. B62K 21/12
[52] U.S. Cl. ..................................... 280/279; 411/222; 411/312
[58] Field of Search ............... 280/279, 280, 276; 74/551.1; 384/607, 617, 540, 545; 411/222, 223, 224, 231, 292, 312, 321, 931

[56] References Cited

U.S. PATENT DOCUMENTS

| Re. 30,547 | 3/1981 | Belden | 280/240 |
|---|---|---|---|
| 3,667,525 | 6/1972 | Spieth | 411/292 |
| 4,934,839 | 6/1990 | Chi | 384/477 |
| 5,080,519 | 1/1992 | Chi | 74/551.1 |
| 5,197,809 | 3/1993 | Chi | 384/617 |
| 5,246,297 | 9/1993 | Chi | 384/607 |
| 5,267,485 | 12/1993 | Chi | 74/551.1 |

OTHER PUBLICATIONS

Tange-Seiki catalog 1994, front cover and pp. 15 and 16
p. 10 of the 1994 catalog of YST corporation.

Primary Examiner—Kenneth R. Rice
Assistant Examiner—Kevin Hurley
Attorney, Agent, or Firm—Sidney W. Millard

[57] ABSTRACT

Locking the headset of a steering post of a bicycle is accomplished by this invention where the steering post or threaded body projects coaxially through a cylindrical journal mounted at the front end of the bicycle frame. Bearing cups are secured in each end of the journal to accommodate thrust bearings. Each thrust bearing in turn is engaged by a cone. The lower cone is mounted stationary on the fork-steering post of the bicycle while the upper cone is threaded engaged to the mounting post body and is drawn hand tight against the upper thrust bearing. The upper cone is locked against rotational movement by a lock nut threaded on the post body above the upper cone and spaced from the upper cone. The locking configuration is achieved by one or more screws extending through an opening in the lock nut and engaging the upper cone to jam the threaded connections between the lock nut, upper cone and steering post body.

8 Claims, 2 Drawing Sheets

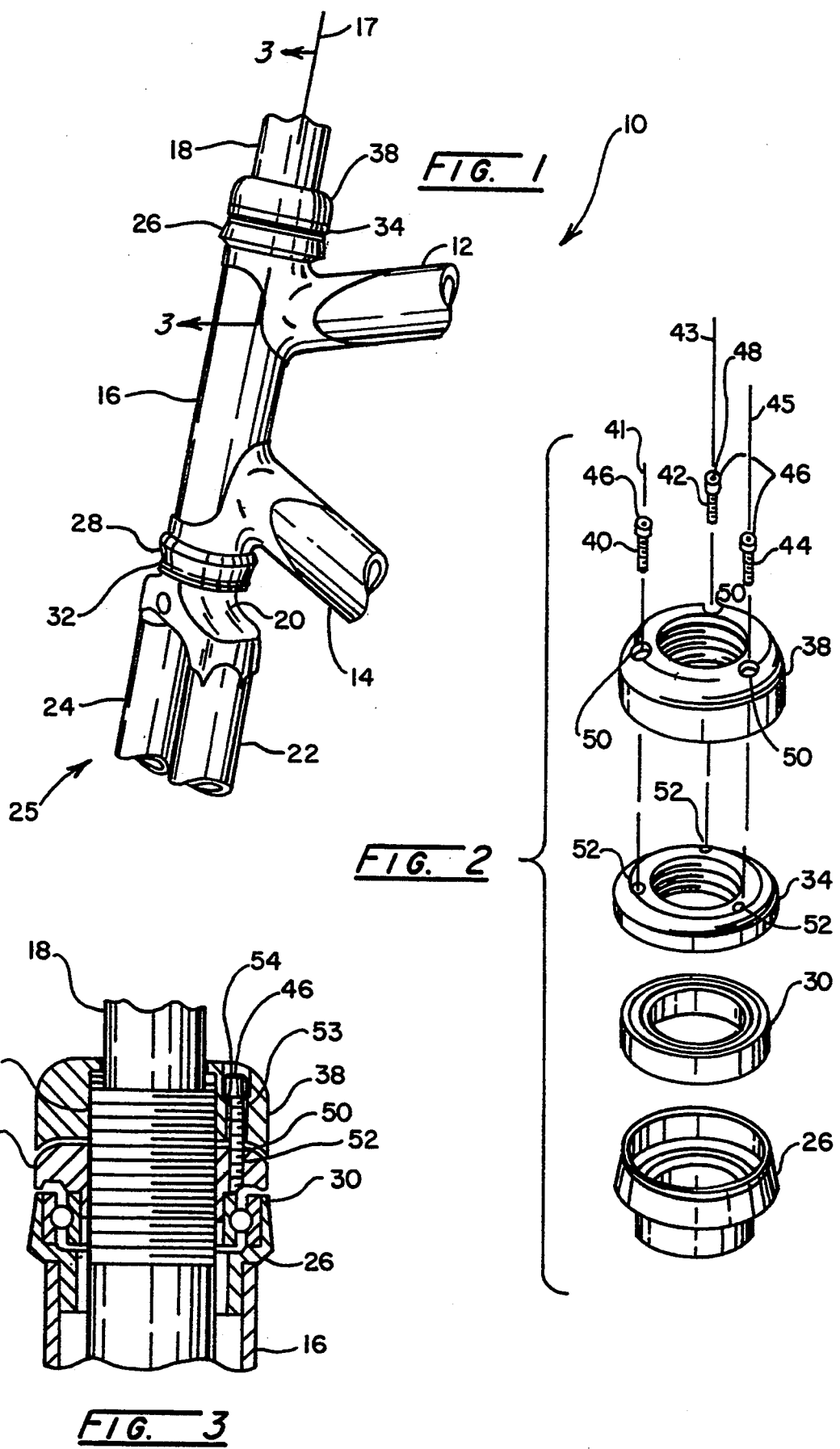

5,385,360

HEADSET LOCKING MECHANISM

FIELD OF THE INVENTION

This invention relates to a structure for locking the headset of a bicycle steering post against relative rotation and loosening of the upper cone on the steering post.

BACKGROUND OF THE INVENTION

Conventional bicycle structure is illustrated in the Reissued U.S. Pat. No. 30,547 to Belden. It includes a front wheel, back wheel, seat, frame, handle bars, and sprocket and chain propelling mechanism. FIG. 2 of the patent illustrates conventional structure which could be used at the front end of the frame to mount the front wheel and handle bars even though FIG. 2 illustrates the mounting structure of the Belden bicycle for the rear wheel.

The Belden patent disclosure includes a fork with the downwardly extending arms of the fork joined at their top end by a bridge. Extending upwardly from the bridge is a threaded body.

A lower cone circumscribing the threaded body mounts a thrust bearing which in turn engages a lower cup secured to one end of a cylindrical journal circumscribing the threaded body. The opposite end of the journal includes a second cup secured thereto to support a second thrust bearing. The second thrust bearing is held in place by an upper cone threaded to the body and locked in place by the combination of a lock washer and a lock nut.

SUMMARY OF THE INVENTION

This invention achieves an improvement over the structure of Belden and similar conventional bicycle apparatus by providing a different and more secure locking nut arrangement.

Essentially all of the conventional structure itemized above in relation to the Belden patent is incorporated into the current invention, but the distinguishing procedural steps for assembling the steering post in combination with the frame and the mounting fork for the front wheel are used in this invention. The problem being solved by this invention is the elimination of wrench flats and knurled surfaces conventionally used on the upper cone and the lock nut. The opportunity for injury on sharp corners and rough surfaces is eliminated by this invention which provides smooth or rounded surfaces where wrench flats and knurled surfaces appeared before.

This invention provides apertures in the locking nut to accommodate screws projecting through the apertures to engage the upper cone. Thereby relative rotational movement between the upper cone and the lock nut is prevented. The same mechanical structure jams the threaded connection between the threaded body, lock nut and upper cone. This combination of features and procedural steps is an advance in the art, and it allows the design of the lock nut and upper cone to have a smooth, rounded exposed surface devoid of wrench flats and knurled surfaces required by the prior art.

In the structure of the invention, the lock nut and upper cone may be mounted together as a unit by the screws extending through openings in the lock nut to threaded engage in apertures in the upper cone. This allows the lock nut and cone to be threaded on the body as a single unit. By this technique, the subsequently described necessary spacing between the lock nut and upper cone are built in mechanically which minimizes procedural steps to the workman assembling the bicycle.

Objects of the invention not clear from the above description will be clear upon a review of the drawings and the following description of the preferred embodiments.

BRIEF DESCRIPTION OF THE DRAWING

FIG. 1 is a perspective view of a bicycle frame mounted with a fork to fit over a wheel and connected to a steering post;

FIG. 2 is an exploded view of the locking mechanism of this invention at the upper side of the apparatus illustrated in FIG. 1;

FIG. 3 is a fragmentary sectional view taken along line 3—3 of FIG. 1;

DESCRIPTION OF THE PREFERRED EMBODIMENT

Figure 4:
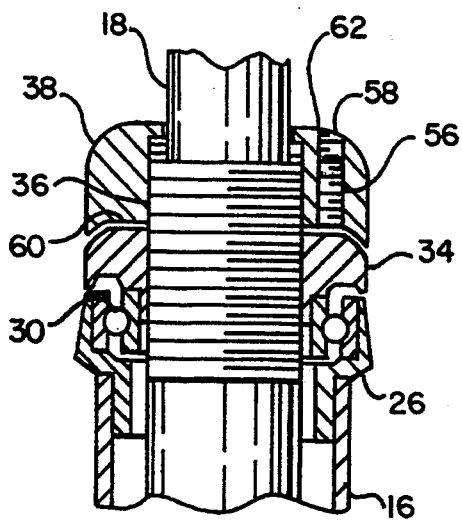
FIG. 4 is a fragmentary sectional view of an alternative embodiment to the structure illustrated in FIG. 3.

FIG. 1 illustrates the forward end of a bicycle 10 showing an upper beam 12 and a cross beam 14 formed integral with a cylindrical sleeve or journal 16 having an axis 17. Hollow cylindrical journal 16 is assembled over a coaxially aligned mounting post 18.

The mounting post 18 is simply illustrated as a rod like structure even though it may be a composite of several parts to serve as a steering post or body for the handle bars. It also is shown as integrally formed or mechanically attached to a bridge 20 extending between a pair of downwardly depending arms 22, 24 which form a yoke or fork 25 to connect to the axle of a bicycle.

Each end of the cylindrical journal 16 includes a cup 26, 28 which is press fitted or otherwise securely mounted in the journal. The lower end cup 28 is not illustrated in detail, but it is essentially a mirror image of what is illustrated in FIG. 3 and it serves the same function, namely, it supports a thrust bearing 30.

A lower cone 32 is normally stationary with respect to the yoke 25 and serves as the lower surface to confine thrust bearing 30.

At the upper end of the illustrated structure in FIG. 1 and looking particularly to FIGS. 2 and 3, an upper cone 34 engages the upper surface of bearing 30 and holds it in place by virtue of being threaded on steering post 18. Threads 36 accommodate mating threads on upper cone 34 and lock nut 38 and it will be observed in FIGS. 3, 4, 5, and 7 that the lock nut 38 is spaced from cone 34 by a small distance or slot for reasons which will be explained subsequently.

The preferred embodiment is illustrated in FIGS. 2 and 3 and includes three screws 40, 42, 44, each having an axis 41, 43, 45, respectively, and an upper end or head 46 with a slot 48 therein to accommodate an Allen wrench for tightening the screws.

Each screw passes through a smooth opening 50 in lock nut 38 and into a threaded aperture 52 in the upper cone 34. The axes of screws 40, 42, and 44 are essentially parallel with the coaxial alignment of journal 16 and threaded body 18.

In operation the lower cone 32 is first mounted over the threaded body 18 and that is followed by the lower thrust bearing 30 which seats on cone 32 to receive the lower cup 28 on journal 16. Journal 16 is then telescopingly mounted over threaded body 18.

Prior to the time the journal 16 slides over the threaded body 18, cups 26 and 28 are secured in place and cup 28 slides down in proximity to lower cone 32 to engage the lower thrust bearing 30. Journal 16 is coaxially mounted with the handle bar mounting post 18 and they are spaced apart from each other to minimize friction.

After the upper thrust bearing 30 is seated in cup 26, the upper cone 34 and the lock nut 38 are threaded into place, and this may be accomplished in more than one way. Preferably they are mounted as a unit with the screws 40, 42, 44 in place and holding the upper cone 34 and the lock nut 38 spaced apart. The smooth outer surfaces of the cone 34 and lock nut 38 allow the unit to be tightened hand tight on the upper thrust bearing 30. Then, to lock the two in place, the upper end 46 of each screw 40, 42, 44 is advanced toward upper cone 34 until the radially outwardly projecting shoulders 53 on the heads of the screws engage radially inwardly projecting flanges 54 in the smooth openings 50. Continued tightening of the screws 40, 42, 44 places the screws in tension and jams the threaded connections between the threads 36 on mounting body 18 and the mating threads on upper cone 34 and lock nut 38. Thereby, the three elements in question, lock nut 38, upper cone 34, and threaded body 18, can have no relative rotational movement. Thus, a more secure headset locking is achieved than is presently available in headset locking apparatus.

It will be clear that the mounting sequence of the cones and cups at each end of the journal 16 could be reversed without departing from the inventive concept. Where the sequence is mentioned it will be understood that the reverse is contemplated, including the claims.

FIG. 4 illustrates an alternative embodiment which includes a set screw 56 in a threaded opening 58 in lock nut 38 and the three threaded set screws are tightened into abutting relationship with the upper surface 60 of upper cone 34 to achieve the desired thread jamming and headset locking.

Note that the same procedural steps apply, in that, the upper end 62 of set screw 56 is advanced toward upper cone 34 to achieve the thread jamming between the upper cone 34, threaded body 18, and set screw 38. The only difference is that the lock nut 38 and upper cone 34 are being pressed apart rather than drawn together as illustrated in FIG. 3. The result however is the same, namely, the threads of the three elements in question are jammed and there will be no relative rotational movement between them. The screws 56 will be placed in compression rather than in tension as with screws 40, 42, 44.

Figure 5:
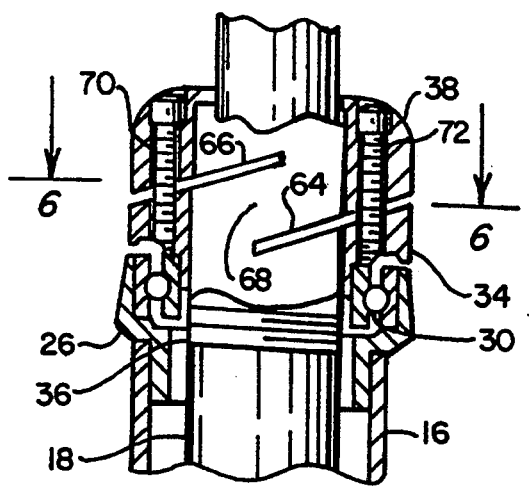
FIG. 5 is a fragmentary sectional view of another alternative embodiment to the structure illustrated in FIG. 3.
Figure 7:
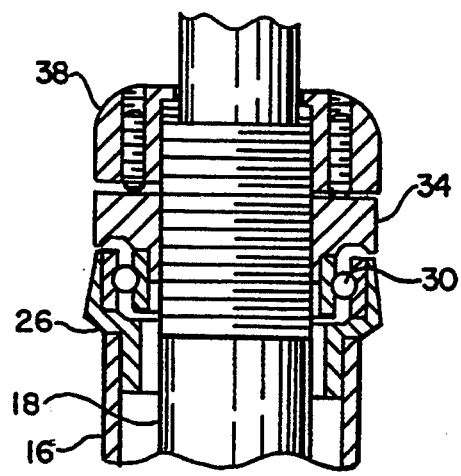
FIG. 7 is a fragmentary sectional view of yet another alternative embodiment to the structure illustrated in FIG. 3.

FIGS. 5 and 7 illustrate an alternative embodiment for FIGS. 3 and 4, respectively. In FIGS. 5 and 7 there are only two screws rather than three. Indeed, one screw of either variety would work but perhaps not so efficiently as the three screws illustrated in the preferred embodiment of FIGS. 2 and 3.

Figure 6:
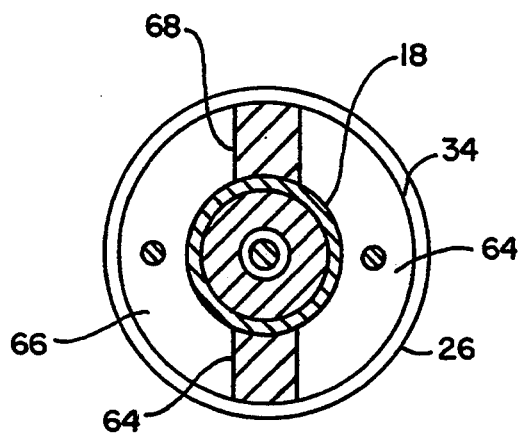
FIG. 6 is a sectional view taken along line 6—6 of FIG. 5.

Looking particularly at FIGS. 5 and 6 which illustrate another way of mounting upper cone 34 and lock nut 38 as a unit to be threaded on mounting post 18, it will be observed that they are formed integrally as a unit and are separated by slits 64, 66 which leave a small piece of spacer metal 68 intermediate slits 64, 66 of the combined unit. The spacer element 68 serves to space the lock nut 38 and upper cone 34 properly to allow the thread jamming to be achieved by a tightening of the bridging screws between the two elements. Spacer metal 68 acts somewhat as a leaf spring but its prime purpose is to space cone 34 from nut 38 so that tightening screws 70, 72 will flex the elements to jam the threads 36, etc.

The spacing 68 between the diagonally extending slits 64 and 66 is exaggerated in FIG. 5. In fact the space 68 may be a mere fraction of an inch to achieve the desired results. Note that slits 66 and 64 extend more than half way through the nut-cone composite. The same result may be achieved where the slits are parallel to each other, perpendicular to the co-axis of journal 16 and body 18, and vertically off-set from each other. Where such slits are horizontal and aligned with each other the spacer 68 may be formed by terminating the slits short of the centerline of the journal.

The particular mechanism for spacing the lock nut and upper cone apart is not critical. Indeed, there could be an elastomeric washer placed between them which would allow flexing of the two metal parts to achieve the jamming in question.

This spacing feature may be understood by considering yet another alternative mounting sequence for the apparatus illustrated in FIGS. 1-3. Where upper cone 34 is initially threaded into hand tight position to engage upper thrust bearing 30 and thereafter the lock nut is tightened into surface contact with the upper surface of cone 34, to achieve the requisite spacing between the threaded elements, locknut may be backed off while being observed by the operator until opening 50 lines up with an aperture 52 and then screws 40, 42, and 44 can be threaded into place.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

I claim:

1. A wheel and steering support apparatus for a bicycle having an axle comprising, a fork having a downwardly extending arm with an end for engaging said axle of said bicycle, said arm including a transversely extending bridge remote from said axle engaging end, a threaded body having an axis projecting upwardly from said bridge, a cylindrical sleeve having an axis, said sleeve coaxially encircling said body, said body and sleeve being configured to rotate independently about their axes, both an upper and a lower cone circumscribing said body and each cone engaging a separate thrust bearing mounted in a separate cup, each cup being mounted at one end of said sleeve and radially spaced from said body, said upper cone threadedly engaging the threaded body to lock said body and sleeve against relative axial movement, a lock nut threadedly engaging said body and spaced from said upper cone, at least one screw having an axis threadedly engaging one of said upper cone and lock nut and applying force along said screw axis to the other of said upper cone and lock nut.

2. The apparatus of claim 1 wherein said at least one screw comprises three screws equally spaced around said lock nut.

3. The apparatus of claim 2 wherein each of said three screws has an axis and each include a head having a shoulder projecting radially of its axis, each screw projecting through an opening in said lock nut to thread into an opening in said cone, each opening including an inwardly projecting flange, each shoulder engaging a flange to place said screw in tension and thereby jam the threads of said upper cone, said lock nut and said body and prevent loosening of said upper cone.

4. The apparatus of claim 3 wherein said lock nut and upper cone have rounded smooth surfaces without any wrench flats.

5. The apparatus of claim 2 wherein said screws threadedly engage threaded openings in said lock nut and abut the surface of said upper cone to place said screws in compression and thereby jam the threads of said lock nut, said upper cone and said body and prevent loosening of said upper cone.

6. The apparatus of claim 5 wherein said lock nut and upper cone have rounded smooth surfaces without any wrench flats.

7. The apparatus of claim 1 wherein said lock nut and upper cone have rounded smooth surfaces without any wrench flats.

8. The apparatus of claim 2 wherein said lock nut and upper cone have rounded smooth surfaces without any wrench flats.

* * * * *